US010843638B2

(12) United States Patent
Erdtmann et al.

(10) Patent No.: US 10,843,638 B2
(45) Date of Patent: Nov. 24, 2020

(54) REMOTE CONTROL HOLDER FOR A ROAD FINISHER

(71) Applicant: JOSEPH VOEGELE AG, Ludwigshafen/Rhein (DE)

(72) Inventors: Bernhard Erdtmann, Mannheim (DE); Thomas Seither, Waldsee (DE); Johannes Pontius, Schmelz (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 0 days.

(21) Appl. No.: 16/433,474

(22) Filed: Jun. 6, 2019

(65) Prior Publication Data
US 2019/0375343 A1 Dec. 12, 2019

(30) Foreign Application Priority Data

Jun. 6, 2018 (EP) ..................................... 18176294

(51) Int. Cl.
*B60R 11/02* (2006.01)
*H01R 33/97* (2006.01)
(Continued)

(52) U.S. Cl.
CPC .......... *B60R 11/0264* (2013.01); *A47B 43/00* (2013.01); *A47B 81/00* (2013.01);
(Continued)

(58) Field of Classification Search
CPC .... B60R 11/0264; F16M 13/00; F16M 13/02; F16M 13/005; A47B 23/043;
(Continued)

(56) References Cited

U.S. PATENT DOCUMENTS 4,709,412 A * 11/1987 Seymour ................ H04B 1/202
341/30
4,815,683 A * 3/1989 Ferrante ................ H01H 9/025
248/205.2
(Continued)

FOREIGN PATENT DOCUMENTS

DE 3603641 A1 * 8/1987 .......... H01H 9/0235
EP 2 644 454 A1 10/2013
(Continued)

OTHER PUBLICATIONS

European Search Report dated Nov. 28, 2018, Application No. 18176294.9, Applicant Joseph Voegele AG, 5 Pages.
(Continued)

*Primary Examiner* — Stanton L Krycinski
(74) *Attorney, Agent, or Firm* — Brooks Kushman P.C.

(57) ABSTRACT

A remote control holder is provided for a road finisher, in particular for a paving screed of the road finisher. The remote control holder is configured to hold a first remote control and a second remote control, the remote controls comprising control elements for controlling functions of the road finisher. The remote control holder comprises two wings that each have a receiving tray, and each wing is intended to receive a remote control in the receiving tray. The wings are pivotable between a first position, in which the wings are arranged substantially flat next to each other and the remote control holder is open, and a second position, in which the wings are substantially pivoted to each other and the remote control holder is closed.

21 Claims, 8 Drawing Sheets

(51) Int. Cl.
*A47B 43/00* (2006.01)
*A47B 81/00* (2006.01)
*B60R 11/00* (2006.01)
*E01C 19/48* (2006.01)
*H01R 13/62* (2006.01)

(52) U.S. Cl.
CPC ........ *H01R 33/97* (2013.01); *B60R 2011/004* (2013.01); *E01C 19/48* (2013.01); *H01R 13/6205* (2013.01)

(58) Field of Classification Search
CPC ....... A47B 23/044; A47B 43/00; A47B 81/00; A47F 5/10; H01H 9/0235; H01H 9/025; H01H 9/0242; H01R 33/97
USPC .......................................................... 211/26.1
See application file for complete search history.

(56) References Cited

U.S. PATENT DOCUMENTS

| | | | | |
|---|---|---|---|---|
| 4,856,658 A * | 8/1989 | Novak | ................... | F16M 13/00 211/26.1 |
| 4,893,222 A * | 1/1990 | Mintzer | .............. | F21V 33/0052 211/26.1 |
| 4,925,149 A * | 5/1990 | DiFrancesca | ........ | B65D 81/113 206/320 |
| RE33,970 E * | 6/1992 | Butler | .................. | H01H 9/0242 206/523 |
| 5,195,634 A * | 3/1993 | Zaug | .................... | G11B 15/023 206/320 |
| 5,244,173 A * | 9/1993 | Kulyk | ...................... | H04N 5/64 211/26.1 |
| 5,305,980 A * | 4/1994 | Le Blanc | ............. | H01H 9/0242 211/26.1 |
| 5,316,249 A * | 5/1994 | Anderson | .............. | H01H 9/025 211/26.1 |
| 5,348,347 A * | 9/1994 | Shink | .................... | B42D 5/006 206/38 |
| 5,370,241 A * | 12/1994 | Silvers | .................. | H01H 9/025 211/150 |
| 5,529,271 A * | 6/1996 | Dunchock | ........... | B60R 11/0241 224/483 |
| 5,603,451 A * | 2/1997 | Helander | ........... | G05D 23/1902 236/51 |
| 6,971,621 B2 * | 12/2005 | Gaines | .................. | A47B 23/043 248/447 |
| 7,237,756 B2 * | 7/2007 | Isenberg | .............. | B42D 17/005 248/441.1 |
| 7,240,887 B2 * | 7/2007 | Buote | .................. | A47B 23/044 248/444.1 |
| 7,731,147 B2 * | 6/2010 | Rha | ....................... | A47B 23/002 248/447 |
| 7,891,632 B2 * | 2/2011 | Rucinski | .............. | A47B 23/044 248/447 |
| 7,957,630 B2 * | 6/2011 | Wu | ...................... | B60R 11/0235 386/361 |
| 8,814,128 B2 * | 8/2014 | Trinh | ...................... | A47F 7/024 248/187.1 |
| 9,078,342 B2 | 7/2015 | Eul et al. | | |
| 9,965,751 B1 * | 5/2018 | Lattman | ............... | G06Q 20/108 |
| 10,053,822 B2 | 8/2018 | Eul et al. | | |
| 2005/0045569 A1 * | 3/2005 | Chang | .................... | A47B 43/00 211/11 |
| 2005/0098510 A1 * | 5/2005 | Lom | ...................... | G06F 1/1607 211/13.1 |
| 2014/0064847 A1 | 3/2014 | Graham et al. | | |
| 2014/0079250 A1 * | 3/2014 | Hirota | .................... | B60R 11/02 381/123 |
| 2014/0260751 A1 | 9/2014 | Graham et al. | | |
| 2016/0102808 A1 * | 4/2016 | Bray | .................... | F16M 13/022 248/206.2 |

FOREIGN PATENT DOCUMENTS

| | | |
|---|---|---|
| EP | 3 075 909 A1 | 10/2016 |
| JP | H 02143846 U | 12/1990 |
| JP | H 0359740 U | 6/1991 |
| JP | 2013217188 A | 10/2013 |
| JP | 2016191299 A | 11/2016 |

OTHER PUBLICATIONS

European Search Report dated Nov. 28, 2018, Application No. 18176294.9, Letter identifiers that indicate relevance of the cited documents.
EP 2 644 454 A1, U.S. Pat. No. 9,078,243 B2.
EP 3 075 909 A1, U.S. Pat. No. 10,053,822 B2.
Japanese Office Action dated May 19, 2020 (with Machine Translation), Application No. 2019-105012, 7 Pages.

* cited by examiner

REMOTE CONTROL HOLDER FOR A ROAD FINISHER

CROSS-REFERENCE TO RELATED APPLICATIONS

This application claims foreign priority benefits under 35 U.S.C. § 119(a)-(d) to European patent application number EP 18176294.9, filed Jun. 6, 2018, which is incorporated by reference in its entirety.

TECHNICAL FIELD

The present disclosure refers to a remote control holder for a road finisher.

BACKGROUND

Road finishers, like other conventional construction machines, have a central control station, which is usually located in an elevated position and includes various control elements required for driving and paving. As it is usually necessary in paving operations to monitor the finishing operation directly on the paving screed of the road finisher in order to adapt its settings immediately to changing environmental conditions, one or more remote controls are mounted on the paving screed, enabling an additional worker to change the paving parameters and at the same time check the setting parameters immediately. For example, there is a remote control to control the screed functions, scraper conveyor, auger, etc. and a second remote control to control an automatic levelling system. The remote controls comprise control elements for making the settings and can also have display elements for displaying setting values. However, the systems known to date for attaching and holding the remote controls onto the paving screed have a number of disadvantages, such as an unfavorable ergonomic arrangement or a missing protection for the remote controls.

SUMMARY

It is an object of the present disclosure to provide an improved remote control holder.

A remote control holder according to the disclosure for a road finisher, in particular for a paving screed of the road finisher, is configured to hold a first and a second remote control, the remote controls comprising control elements for controlling functions of the road finisher. Here, the remote control holder comprises two wings, each with a receiving tray, and each wing is intended to receive a respective remote control in the receiving tray. The wings are pivotable between a first position, in which the wings are arranged substantially flat next to each other and the remote control holder is open, and a second position, in which the wings are substantially pivoted to each other and the remote control holder is closed. The trough-shaped receiving trays have a length and width so that a remote control can be inserted into each of them, and their height substantially corresponds to that of the remote control. This provides the best possible protection for the remote control against external influences. The side-by-side arrangement of the wings makes the best possible use of the space available on the paving screed, so that a worker's freedom of movement is not restricted. During operation of the road finisher, the unfolded, open position of the remote control holder is occupied to use the remote controls, and the closed, pivoted-together position can be occupied to store the remote controls at the end of operation. In the closed position the remote controls are surrounded by the housing parts of the remote control holder on all sides to the outside and are thus best protected. In addition, the remote control holder takes up very little space in the closed position, which is particularly advantageous when the paving screed is pushed together and the road finisher is moved or loaded.

In an advantageous variant, the remote control holder comprises a middle part on which the first and second wings are pivotably supported. The middle part thus offers the mechanical connection of the two wings and allows the geometrical arrangement of the components in such a way that the wings can be pivoted to each other. It can be particularly advantageous and space-saving if the middle part has substantially the height and length of the receiving trays and a width which corresponds to twice the height of the receiving trays. Other electronic components, such as a wiring harness, can also be installed in the middle part. In addition, a front part can be attached to the middle part, which comprises further components, such as an emergency stop button or a signal lamp.

In a preferred variant, the first wing and the second wing are pivotably supported about a first pivot axis. Thus, the wings can be pivoted or folded onto each other in order to bring the remote control holder into the closed state as well as to open the remote control holder with the opposite movement. With an arrangement in which both wings can be rotated about the same pivot axis, the remote control holder can be implemented in a particularly space-saving manner.

Preferably, the first wing is pivotably supported about a first pivot axis and the second wing about a second pivot axis, and the pivot axes are oriented parallel to each other. Thus, the wings or the pivot axes can be arranged symmetrically in the overall structure, so that the closed state of the remote control holder corresponds to a substantially central position of the two wings. In addition, the two wings can be constructed exactly mirror-symmetrically. Thus, in the closed position pivoted to each other, the wings lie flat against each other and the construction of the parts is particularly simple.

In a standard variant, the remote control holder is detachably mounted on the road finisher. The remote control holder can thereby be mounted on the road finisher or the paving screed with a plurality of connection mechanisms, such as a screw or plug-in connection, and ideally no tools are required to release the connection. This allows the remote control holder to be removed at the end of operation to keep it safe and protected from environmental influences elsewhere. This also prevents unauthorized operation of the road finisher. It is also possible to remove the remote control holder from the road finisher both in the open and closed state. Alternatively, however, the remote control holder can also remain on the machine, in particular fastened in such a way that it can only be detached with a tool. It is particularly conceivable that the remote control holder can only be detached with special tools and is therefore particularly theft-proof. This allows the wings to be folded up at the end of operation and the remote control holder to be locked as described below, which protects the remote controls from environmental influences and from removal.

Ideally, the remote controls can be detachably mounted in the remote control holder. The remote controls can also be removed individually for storage, repair or replacement. In addition, while maintaining a data connection, a remote control can be removed to monitor and control the function of the paving screed also from a different position.

The remote control holder preferably comprises a vibration decoupler to shield the remote controls from vibrations of the road finisher. This dampens the vibrations of the engine, chassis and paving screed of the road finisher sufficiently to prevent damage to the remote controls, in particular the electronic components, such as the breaking of soldered joints.

In a common variant, the remote control holder comprises eyelets to be lockable in the closed state. It is expedient to have one eyelet on each of the first and second wings, so that these can be connected with a clamp, for example, to prevent the remote control holder from opening on its own. It is also possible to attach a clamp or hook already to one of the wings and, when the remote control holder is in the closed state, to simply hang it in one eyelet of the other wing. Moreover, the eyelets can also be connected with a padlock to prevent unauthorized opening of the remote control holder.

In another advantageous variant, the remote control holder includes a lock to be lockable in the closed state. The lock, which is integrated into the remote control holder in contrast to a loose padlock or shackle lock, is operated with a key and thus only authorized persons are allowed access to the remote controls.

Ideally, each wing comprises a recess to facilitate pivoting of the wings into the open state of the remote control holder. As explained in more detail below in the drawings, the wings can thus be gripped more easily in order to pivot them apart. In addition, the recess can make it easier to remove the remote control.

In another variant, the wings comprise plug connections to which the remote controls can be plugged. This establishes the electronic connection from the remote controls to the control system of the road finisher. For example, a CAN bus system can be used. If a plug is mounted on the respective wing in a stationary manner, the respective remote control can also be fixed thereby. It is also possible here to provide the plug in a stationary, but pivotable manner, so that plugging and unplugging is possible in a forwardly folded position of the plug and the plug is otherwise oriented parallel to the bottom of the receiving tray of the wing when the remote control is fully inserted into the receiving tray.

Expediently, each of the wings comprises a magnet to fix the remote controls. The remote controls, which also include a magnet or ferromagnetic components for this purpose, can be inserted and removed again particularly easily in the receiving trays and are at the same time fixed in the receiving trays in a stationary manner, at least within a certain force range.

In an expedient variant, each of the wings can be locked in the first position, in which the wings are arranged substantially flat next to each other, and/or in the second position, in which the wings are substantially pivoted to each other. As shown below, this can be done, for example, by pins or knobs which engage with corresponding grooves. The pins or knobs can, for example, be spring-mounted and, due to the selected spring pressure, recede above a certain force and allow the wings to pivot. In this way, the wings remain in the respectively desired position, especially when shocks or vibrations occur.

In another preferred variant, a connecting cable is guided through a connecting part which is used to attach the remote control holder to the paving screed. The connecting cable can comprise several conductors and, for example, supply power to the remote control holder or the two remote controls arranged therein and establish a data connection with the electronic control device of the road finisher. For example, the connecting part can comprise a bushing and can be plugged to a fitting counterpart, such as a pin, on the paving screed. The connecting cable can be guided through the connecting part and the pin, which is expediently hollow for this purpose. Thus, the connecting cable is particularly space-savingly laid and protected from environmental influences or damage.

In a particularly expedient variant, one or both of the wings accommodates a cable support with a pull-out cable for connecting to a remote control and the cable support has a retraction mechanism to retract the pull-out cable back into the cable support. This means that the remote controls can also be used when they are removed from the remote control holder. This allows the settings of the paving screed to be monitored and controlled, even if it is necessary to monitor the paving process from a position other than that where the remote control holder is mounted. The cable may be firmly connected to the remote control or may be detachable via a plug connection as described above. Due to the retraction mechanism the cable is rolled up into the cable support when the remote control is returned to the receiving tray and does not remain in the receiving tray or anywhere else on the remote control holder where insertion into the receiving tray is interfered with or where a worker might get caught by the downwardly hanging cable.

BRIEF DESCRIPTION OF THE DRAWINGS

In the following, embodiments of the disclosure are described in more detail using the figures, of which

Components corresponding to each other are provided with the same reference signs in the figures.

DETAILED DESCRIPTION

Figure 1:
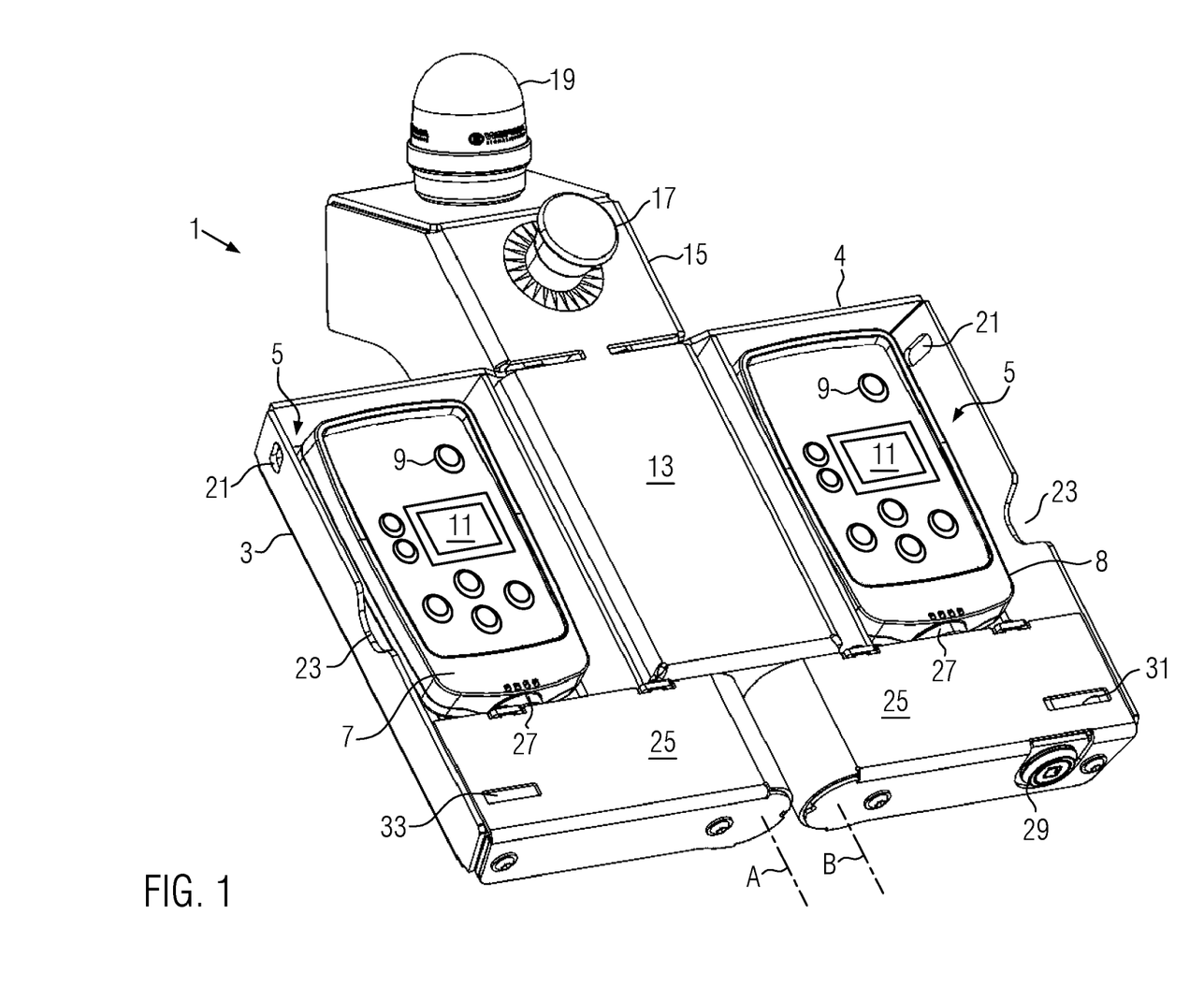
FIG. 1 is a perspective view of a remote control holder with two remote controls.

FIG. 1 shows a remote control holder 1 with two pivotable wings 3, 4, each comprising a receiving tray 5 in which a remote control 7, 8 is respectively inserted. The remote controls 7, 8 comprise control elements 9 and display elements 11 for controlling the functions of a road finisher or a paving screed. The first wing 3 is pivotably mounted on a middle part 13 about an axis A and the second wing 4 is pivotably mounted on the middle part 13 about an axis B, with the two axes A and B being parallel to each other. The middle part 13 has adjacently formed thereon a front part 15 on which additional components such as an emergency stop button 17 and a signal lamp 19 are installed. At the side of the wings 3, 4, an eyelet 21 is respectively formed through which a lock, for example a shackle lock, can be guided in the folded-together state to lock the remote control holder 1.

A hook-like element without a lock function can also be hooked into the eyelets 21 to keep the remote control holder 1 in the closed state. In addition, there is a respective recess 23 which makes it easier to remove the remote controls 7 and 8 and to swing the wings 3 and 4 out of the closed state. In the lower part of the wings 3, 4 there are housings 25 which can accommodate electronic components as well as connecting elements such as cables and plug connections. A plug connection 27, which can be used, for example, for current and voltage supply as well as for connection to a CAN bus, can respectively be seen between the remote control 7, 8 and the housing 25. In addition, a lock 29 is arranged in the second wing 4, which lock 29 in a closed, pivoted-together state engages a hook 31 with an eyelet 33 of the first wing 3 and thus locks the remote control holder 1.

Figure 2:
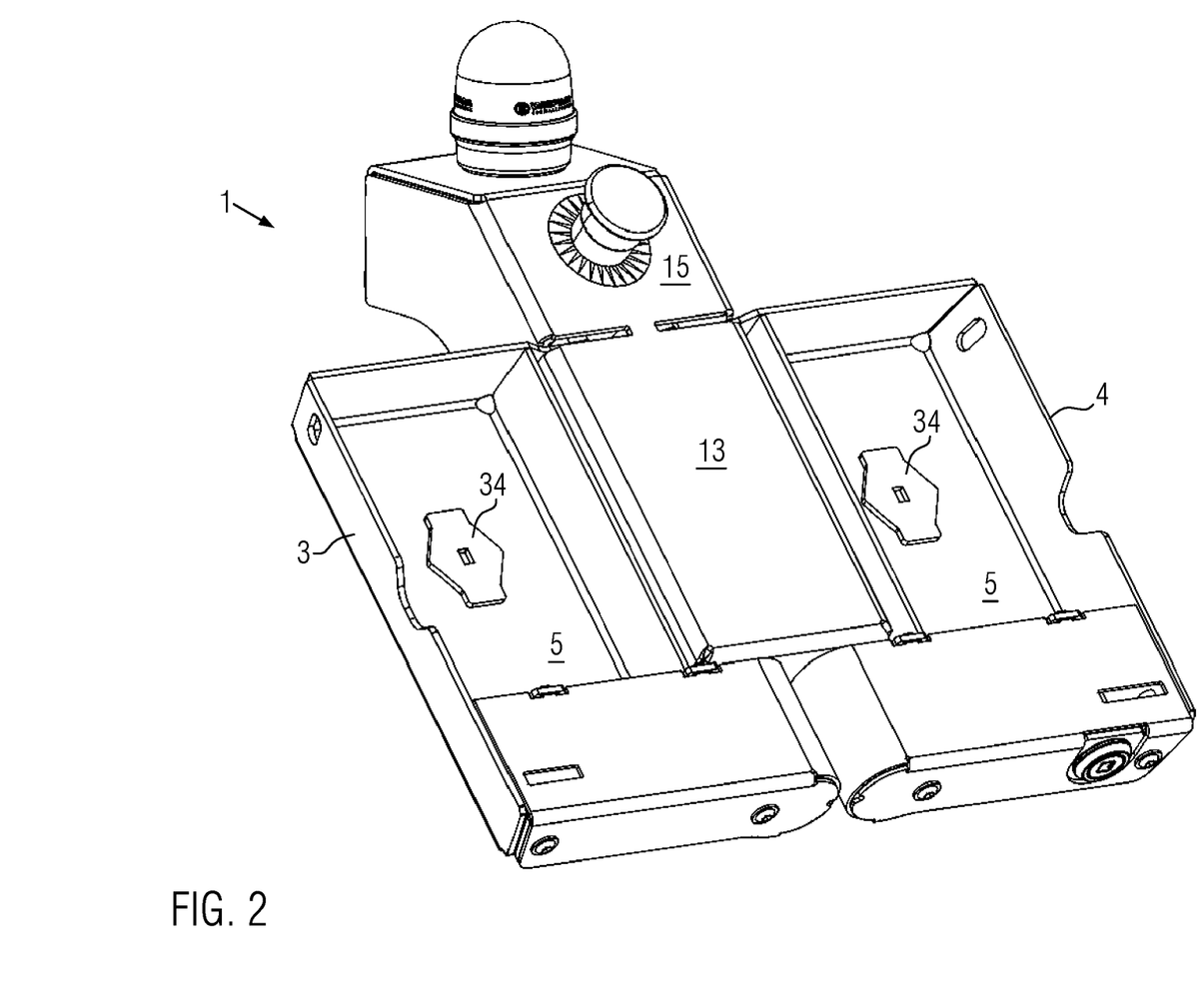
FIG. 2 is a perspective view of a remote control holder with free receiving trays.

FIG. 2 shows the remote control holder 1 with free receiving trays 5 in which magnets 34 are mounted to fix the remote controls 7, 8. The backs of the remote controls 7, 8 can additionally be designed in such a way that they have complementary shapes to the magnets 34 in order to mechanically interlock with the magnets 34.

Figure 3:
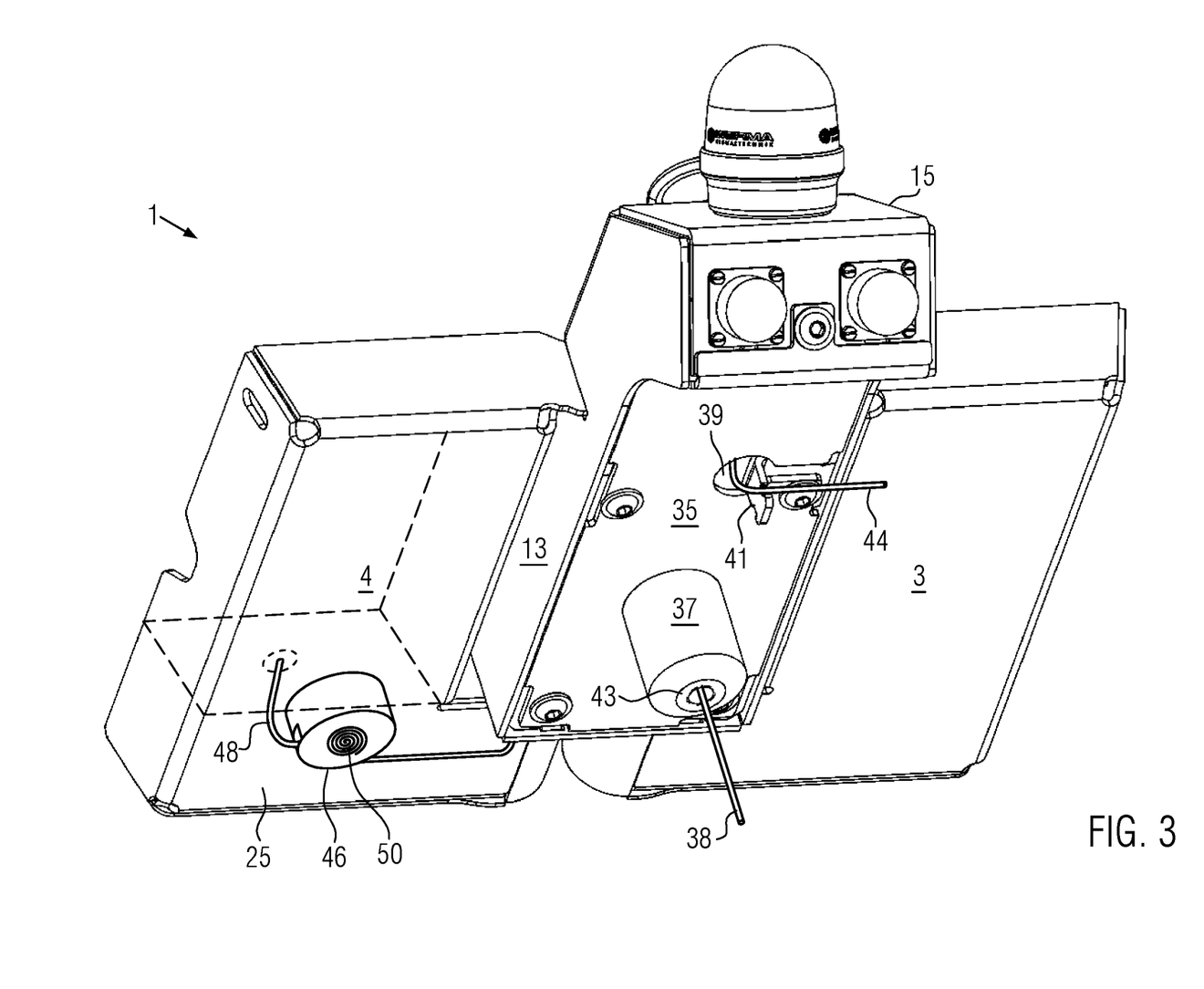
FIG. 3 is a perspective rear view of a remote control holder.

FIG. 3 shows a perspective rear view of the remote control holder 1. The middle part 13 is closed with a removable cover 35, on which a connecting part 37 is mounted, in this form for plugging onto a holder on the paving screed. The connecting part 37 comprises a vibration decoupler 43, which for example is designed as a bushing supported by a spring and a damper. A corresponding counterpart on the paving screed, for example in the form of a pin, can snap into the vibration decoupler 43 when the remote control holder 1 or the connecting part 37 is plugged thereonto. A connecting cable 38 can be guided through the connecting part 37, which connecting cable 38 connects the remote controls 7 and 8 to an electronic control system of the road finisher and supplies power to the remote controls 7 and 8. The counterpart, e.g., the pin, on the paving screed is expediently hollow in order to guide the connecting cable 38 also therein. Alternatively, or additionally, one or more connecting cables 44 can be guided from the electronic control system of the road finisher to the remote controls 7, 8 via a separate opening 39 and a first cable guide 41.

For the second wing 4 a cable support 46 is shown inside the housing 25, in an exemplary manner as a view therethrough, which cable support accommodates a pull-out cable 48. The pull-out cable 48 can be connected, e.g., plugged, to the remote control 8. If the remote control 8 is removed from the remote control holder 1, the cable 48 is pulled out of the cable support 46. The cable support 46 in this embodiment also comprises a retraction mechanism 50, for example in the form of a pre-tensioned spiral mainspring, which tensions the cable 48 with a certain retraction force when it is pulled out and retracts the cable 48 again into the cable support 46 and winds it up therein when the remote control 8 is returned. The same device can also be used for the first wing 3.

Figure 4:
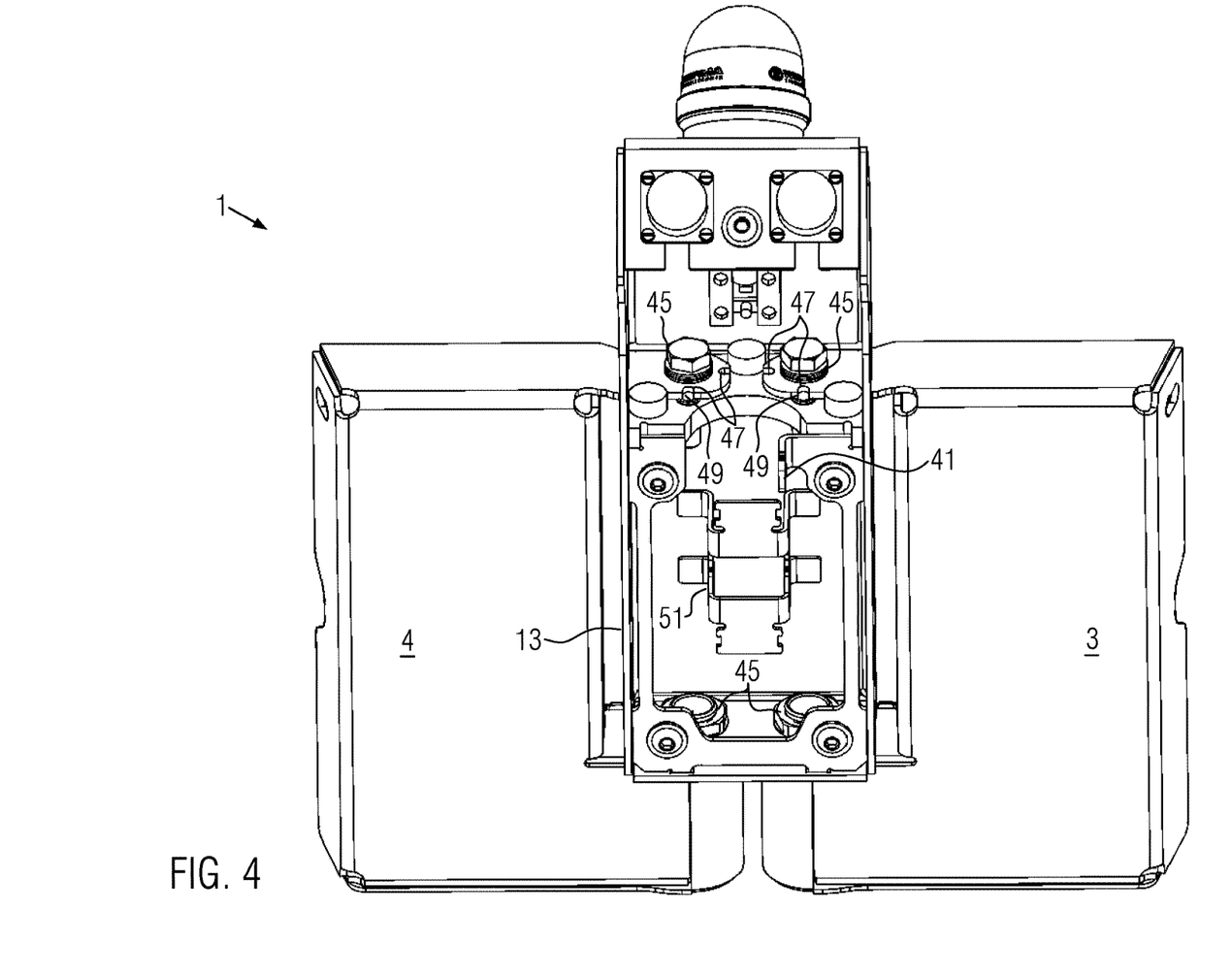
FIG. 4 is a perspective rear view of a remote control holder with open cover of a middle part.

FIG. 4 shows a perspective rear view of the remote control holder 1 with removed cover 35 of the middle part 13. Hinges 45 are visible, around which the wings 3, 4 are rotatably supported. The hinges 45 may comprise grooves 47 which engage with spring-loaded knobs 49 to lock the wings 3, 4 in the open position as well as in the closed, pivoted-together position. In addition to the first cable guide 41, a second cable guide 51 is arranged to guide the connecting cables from a road finisher to the remote controls 7, 8 and to ensure strain relief and additional decoupling of vibrations by using appropriate clamping.

Figure 5:
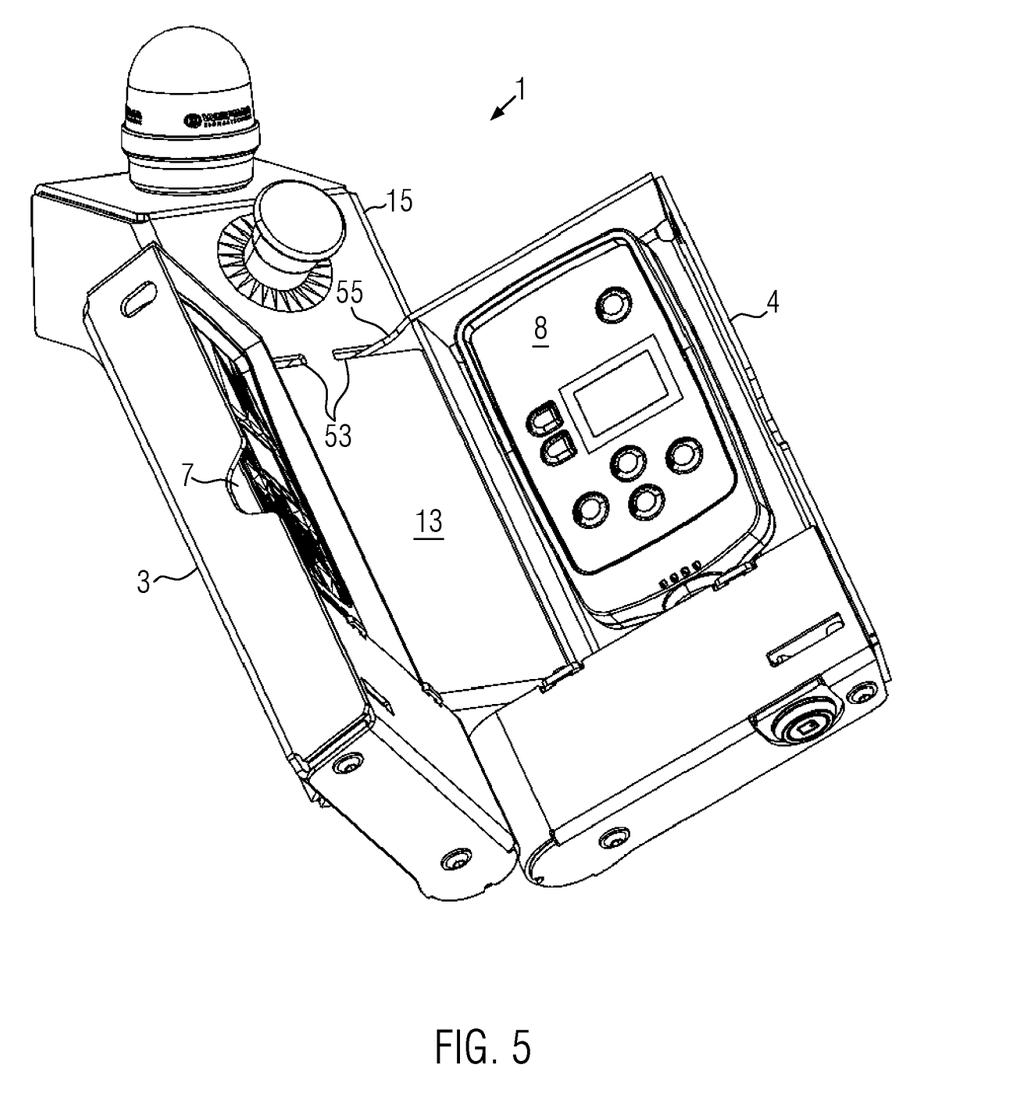
FIG. 5 is a perspective view of a remote control holder with wings in a middle pivot position.

FIG. 5 shows the remote control holder 1 in which the wings 3, 4 are pivoted into a middle intermediate position. Slits 53 are formed at the transition between middle part 13 and front part 15 so that connecting sections 55 of the wings 3, 4 can be pivoted through the slits 53 with the hinges 45 in order to position the wings 3, 4 folded together above the middle part 13.

Figure 6:
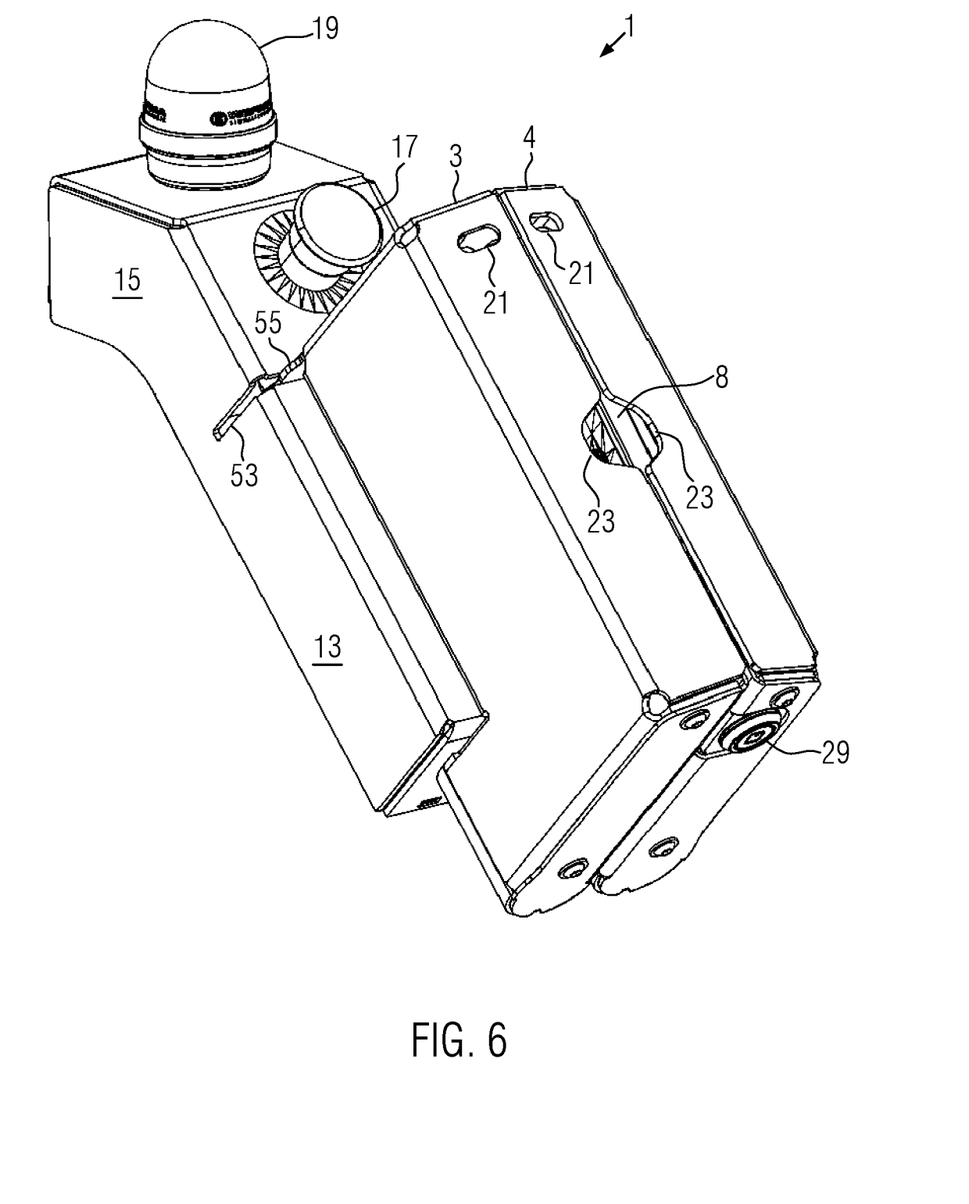
FIG. 6 is a perspective view of a remote control holder with wings in a position pivoted to each other.

FIG. 6 shows a perspective view of the remote control holder 1, in which the wings 3, 4 are in a closed position pivoted to each other. In this position, access to the remote controls 7, 8 is prevented and they are also protected from external environmental influences such as UV radiation and weather. The arrangement shown saves space and is therefore particularly suitable for removing the remote control holder 1 from the paving screed and storing it elsewhere. Opening the remote control holder 1 can be prevented in particular by connecting the eyelets 21 with a hook and by closing the lock 29. When the wings 3, 4 are swung open, the recesses 23 can serve as a grip.

Figure 7:
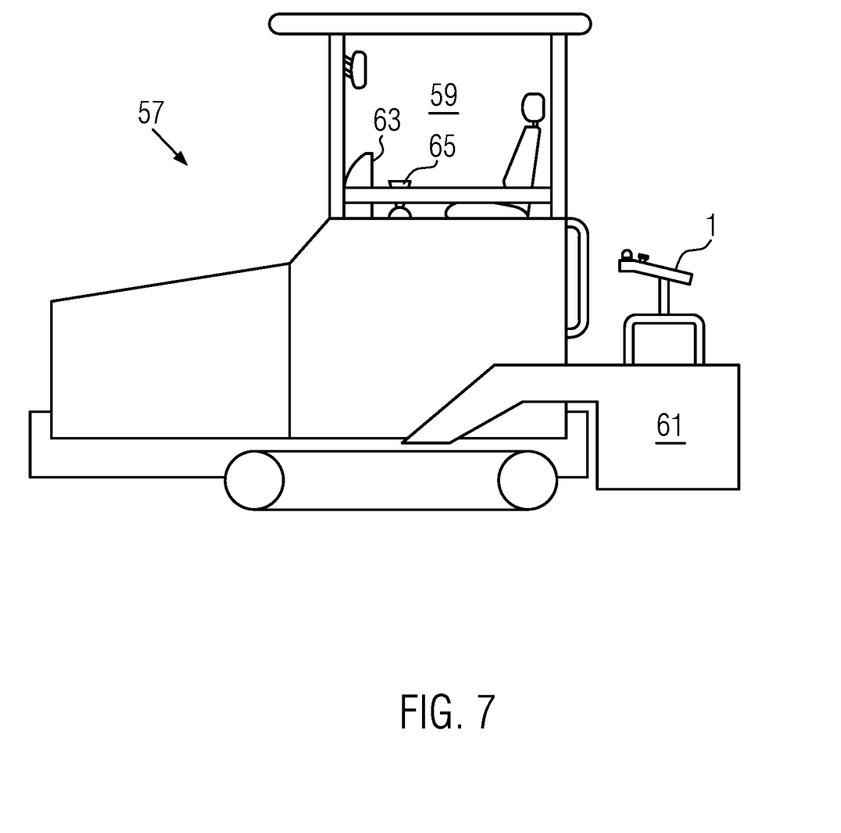
FIG. 7 is a schematic side view of a road finisher with paving screed and remote control holder.

FIG. 7 shows a schematic side view of a road finisher 57 with a main control station 59 and a paving screed 61. The main control station 59 is equipped with a control panel 63 and other control devices 65 so that a driver can control all functions of the road finisher 57. The paving screed 61 has mounted thereon the remote control holder 1, so that another worker by using the remote controls 7, 8 arranged in the remote control holder 1 can control functions of the road finisher 57, in particular the settings of the paving screed 61, directly on said screed and thus in the immediate vicinity of the paving operation. The remote control holder 1 is expediently arranged at a lateral end of the paving screed 61, with a respective remote control holder 1 being usually located at both lateral ends, as it is particularly important in the finishing operation to monitor the lateral edges of the newly finished road surface.

Based on the above mentioned embodiments of a remote control holder 1, many variations of the same are possible. For example, there may be a spring mechanism in the middle part 13, which promotes the pivoting of the wings 3, 4 in one direction, e.g., into the closed position. The remote controls 7, 8 can include batteries or accumulators and in an alternative operating mode they can be connected wirelessly to the control system of the road finisher 57 instead of cables 38, 44, 48.

Figure 8:
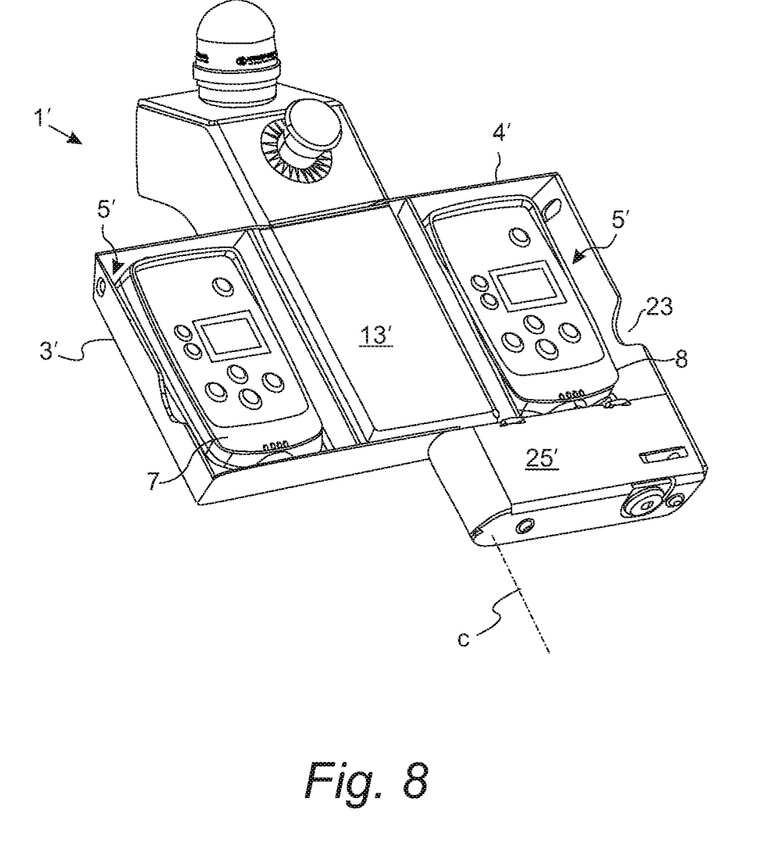
FIG. 8 is a perspective view of another embodiment of a remote control holder according to the present disclosure.

FIG. 8 shows another embodiment 1' of a remote control holder according to the present disclosure. The remote control holder 1' includes a first wing 3' and a second wing 4' that are pivotably supported about a first pivot axis C. Thus, the wings 3' and 4' can be pivoted or folded onto each other in order to bring the remote control holder 1' into a closed state as well as to open the remote control holder 1' with the opposite movement. With the above arrangement in which both wings 3' and 4' can be rotated about the same pivot axis C, the remote control holder 1' can be implemented in a particularly space-saving manner.

What is claimed is:

1. A remote control holder for a road finisher, the remote control holder being configured to hold a first remote control and a second remote control, the remote controls including control elements for controlling functions of the road finisher, wherein the remote control holder comprises a middle part and first and second wings pivotably supported on the middle part, wherein each wing has a connecting section that extends into the middle part, the connecting section of the first wing is pivotably supported about a first pivot axis, the connecting section of the second wing is pivotably supported about a second pivot axis, and the pivot axes are oriented parallel to each other and extend through the middle part, wherein each wing has a receiving tray, and each wing is configured to receive a remote control in the receiving tray, and wherein the wings are pivotable between a first position, in which the wings are arranged substantially flat next to each other and the remote control holder is open, and a second position, in which the wings are substantially pivoted to each other and the remote control holder is closed.

2. The remote control holder according to claim 1, wherein the remote control holder is configured to be detachably mounted on the road finisher.

3. The remote control holder according to claim 1, wherein the remote controls can be detachably mounted in the remote control holder.

4. The remote control holder according to claim 1 further comprising a vibration decoupler for shielding the remote controls from vibrations of the road finisher.

5. The remote control holder according to claim 1 further comprising eyelets in order to be lockable in the closed state.

6. The remote control holder according to claim 1 further comprising a lock to be lockable in the closed state.

7. The remote control holder according to claim 1, wherein each wing comprises a recess to facilitate pivoting of the wings into the open state of the remote control holder.

8. The remote control holder according to claim 1, wherein the wings have plug connections to which the remote controls can be plugged.

9. The remote control holder according to claim 1, wherein the wings each comprise a magnet for fixing the remote controls.

10. The remote control holder according to claim 1, wherein each of the wings is lockable in the first position, in which the wings are arranged substantially flat next to each other, and/or in the second position, in which the wings are substantially pivoted to each other.

11. The remote control holder according to claim 1 further comprising a connecting part and a connecting cable guided through the connecting part, wherein the connecting part is configured for fastening the remote control holder to the road finisher.

12. The remote control holder according to claim 1, wherein one or both of the wings houses or house a cable support with a pull-out cable for connection to a remote control, and the cable support comprises a retraction mechanism for retracting the pull-out cable into the cable support.

13. The remote control holder according to claim 1 wherein the remote control holder has a back surface and a connecting part protruding from the back surface for connecting the remote control holder to the road finisher, and wherein the connecting part includes a vibration decoupler for damping vibrations associated with the road finisher, and the vibration decoupler has an opening configured to receive a connecting cable for connecting the remote controls to an electronic control system of the road finisher.

14. The remote control holder according to claim 1 wherein the middle part has slits that receive connecting sections of the wings, wherein the connecting sections of the wings can be pivoted through the slits in order to position the wings folded together above the middle part.

15. The remote control holder according to claim 1 wherein the middle part has a front part on which a stop button is installed.

16. The remote control holder according to claim 1 wherein the middle part has a front part on which a signal lamp is installed.

17. A remote control holder for a road finisher, the remote control holder being configured to hold a first remote control and a second remote control, the remote controls including control elements for controlling functions of the road finisher, wherein the remote control holder comprises two wings that each have a receiving tray, and each wing is configured to receive a remote control in the receiving tray, wherein the wings are pivotable between a first position, in which the wings are arranged substantially flat next to each other and the remote control holder is open, and a second position, in which the wings are substantially pivoted to each other and the remote control holder is closed, wherein the remote control holder has a back surface and a connecting part protruding from the back surface for connecting the remote control holder to the road finisher, and wherein the connecting part includes a vibration decoupler for damping vibrations associated with the road finisher, and the vibration decoupler has an opening configured to receive a connecting cable for connecting the remote controls to an electronic control system of the road finisher.

18. The remote control holder according to claim 17, wherein the first wing and the second wing are pivotably supported about a first pivot axis.

19. A remote control holder for a road finisher, the remote control holder being configured to hold a first remote control and a second remote control, the remote controls including control elements for controlling functions of the road finisher, wherein the remote control holder comprises a middle part and first and second wings pivotably supported on the middle part, wherein each wing has a receiving tray, and each wing is configured to receive a remote control in the receiving tray, wherein the wings are pivotable between a first position, in which the wings are arranged substantially flat next to each other and the remote control holder is open, and a second position, in which the wings are substantially pivoted to each other and the remote control holder is closed, wherein the middle part has slits that receive connecting sections of the wings, and wherein the connecting sections of the wings can be pivoted through the slits in order to position the wings folded together above the middle part.

20. A remote control holder for a road finisher, the remote control holder being configured to hold a first remote control and a second remote control, the remote controls including control elements for controlling functions of the road finisher, wherein the remote control holder comprises a middle part and first and second wings pivotably supported on the middle part, wherein each wing has a receiving tray, and each wing is configured to receive a remote control in the receiving tray, wherein the wings are pivotable between a first position, in which the wings are arranged substantially flat next to each other and the remote control holder is open, and a second position, in which the wings are substantially pivoted to each other and the remote control holder is closed, and wherein the middle part has a front part on which a stop button or a signal lamp is installed.

21. The remote control holder of claim 20 wherein the remote control holder includes both the stop button and the signal lamp installed on the front part.

* * * * *